United States Patent
Chambers, Jr. et al.

(10) Patent No.: US 7,730,219 B2
(45) Date of Patent: Jun. 1, 2010

(54) SYSTEM AND METHOD FOR DETECTING FREE AND OPEN WIRELESS NETWORKS

(75) Inventors: Howell Jack Chambers, Jr., Wake Forest, NC (US); David Karner, Raleigh, NC (US); James Andrew North, Raleigh, NC (US); Thomas Vanderkin, Raleigh, NC (US)

(73) Assignee: Lenovo (Singapore) Pte. Ltd. (SG)

( * ) Notice: Subject to any disclaimer, the term of this patent is extended or adjusted under 35 U.S.C. 154(b) by 195 days.

(21) Appl. No.: 11/970,047

(22) Filed: Jan. 7, 2008

(65) Prior Publication Data

US 2009/0177801 A1   Jul. 9, 2009

(51) Int. Cl.
*G06F 15/16* (2006.01)
(52) U.S. Cl. ..................... 709/250; 709/203
(58) Field of Classification Search .............. 709/203
See application file for complete search history.

(56) References Cited

U.S. PATENT DOCUMENTS

| | | | |
|---|---|---|---|
| 2005/0125693 A1* | 6/2005 | Duplessis et al. | 713/201 |
| 2007/0274274 A1* | 11/2007 | Carothers | 370/338 |
| 2007/0277047 A1* | 11/2007 | Mehta et al. | 713/300 |
| 2009/0028082 A1* | 1/2009 | Wynn et al. | 370/310 |

* cited by examiner

*Primary Examiner*—Hassan Phillips
*Assistant Examiner*—Glenford Madamba
(74) *Attorney, Agent, or Firm*—Vanleeuwen & Vanleeuwen; Carlos Munoz-Bustamante (57) ABSTRACT

A system, method, and program product is provided that passively detects the existence of wireless networks in proximity to a wireless signal detector. A determination is made as to whether the detected wireless networks are encrypted or unencrypted. For those wireless networks that are unencrypted, a restriction level that applies to the unencrypted network is identified. The user is then notified when an unencrypted and unrestricted wireless network is detected.

17 Claims, 8 Drawing Sheets

SYSTEM AND METHOD FOR DETECTING FREE AND OPEN WIRELESS NETWORKS

BACKGROUND OF THE INVENTION

1. Technical Field

The present invention relates to a system and method that detects wireless networks, often referred to as "hot spots." More particularly, the present invention relates to a system and method that determines if a wireless network is truly open or if restrictions apply to usage of the wireless network.

2. Description of the Related Art

Many computer users that frequently travel enjoy accessing computer networks, such as the Internet, using publicly available wireless networks called "hotspots." Hotspots are publicly accessible network (Internet) connections that anyone with a wireless device can connect to, provided that the user knows that the hotspot is present. Once aware of the hotspot, the user generally uses a mobile computing device, such as a laptop computer, to access the network. Because of the cumbersomeness of repeatedly pulling out a laptop computer and powering the computer up to see if the user is currently in a hotspot, hotspot detectors have been developed.

Hotspot detectors are generally small devices (usually small enough to connect to a keychain or store in a small pouch in your laptop carry case) that detect the presence of a hotspot. Hotspot detectors are a more efficient way to determine whether an available wireless connection exists than the "pull and power" routine of using a portable (e.g., laptop) computer to check availability.

Traditional hotspot detectors detect whether a wireless network is in the vicinity (in range) as well as whether the network is "open" or "protected." A protected wireless network is generally an encrypted network that only allows access to the network to employees or other individuals that have access to "secrets," such as passwords, needed to access the protected wireless network. A wireless network used by a business, home, or organization to access that entity's data is usually encrypted (protected) to prevent outsiders from accessing sensitive data. Obviously, a user that is passing through likely would not possess the security credentials needed to access the protected wireless network. So, knowing that a hotspot is a protected hotspot, prevents the user from trying to access the network using the user's portable computing device. Instead, the user is searching for open wireless networks.

A challenge of existing art is that unencrypted (unprotected) networks are often not truly open. Instead, the quasi-open network may require the user to access the network using a particular proxy server that requires the user to either agree to certain terms and conditions or pay money before being allowed to use the network. However, traditional hotspot detectors only detect that the wireless network is not encrypted (i.e., not protected) and do not detect the existence of these extra requirements, terms, or conditions. Using traditional hotspot detectors, the user would receive an indication from the hotspot detector that an "open" hotspot was available. The user would then have to use his or her portable computing device, such as a laptop computer, to access the network. At this point, the user would finally be presented with the extra requirements, terms, or conditions required to access the network through this wireless network.

A user searching for a truly open wireless network (hotspot) to access the Internet may wind up trying several "open" networks identified at various points of time by his or her hotspot detector before finding a truly open hotspot. Consequently, the traditional hotspot detector's inability to distinguish "truly open" hotspots from "quasi-open" hotspots can be exceedingly aggravating and time consuming to a user in need of accessing the computer network.

SUMMARY

It has been discovered that the aforementioned challenges are resolved using a system, method and computer program product that passively detects the existence of wireless networks in proximity to a wireless signal detector. A determination is made as to whether the detected wireless networks are encrypted or unencrypted. For those wireless networks that are unencrypted, a restriction level that applies to the unencrypted network is identified. The user is then notified when an unencrypted and unrestricted wireless network is detected.

In one embodiment, the restriction level of unencrypted networks is identified by sending a ping request to a predetermined network address using each of the unencrypted wireless networks. Those networks where a successful ping reply is received are classified as unrestricted. On the other hand, those networks where a reply is not received from the ping request are classified as restricted.

In another embodiment, the restriction level of unencrypted networks is identified by accessing each of the unencrypted wireless networks and retrieving an initial page of data from each of the accessed unencrypted wireless networks. Fields included in each of the retrieved initial pages are compared with expected fields. In this embodiment, when no unexpected fields are found, then the wireless network is classified as unrestricted. However, if unexpected fields are found on the initial page, then the wireless network is classified as restricted.

In one embodiment, the notifying of the user includes sounding an audible alert when at least one unrestricted wireless network is detected in proximity to the wireless signal detector. In another embodiment, the notifying of the user is accomplished by reading user preferences, comparing the preferences to data corresponding to the detected wireless networks, and then selecting a "best" wireless network based on the comparison. An indicator is then displayed to the user on a constrained display with the indicator showing that an unrestricted wireless network was detected in proximity to the user's device (e.g., a mobile telephone, a personal digital assistant (PDA), etc.).

In another embodiment, the notifying of the user includes reading preferences and then sorting records corresponding to the detected wireless networks based on the user preferences. Each record include the restriction level of the corresponding wireless networks. The sorted records are then displayed to the user on a display screen. The user selects one of the records that corresponds to one of the wireless network and the user's computer system is then connected to the selected wireless network. In a further embodiment, the records also include the signal strength of each of the wireless networks as well as the network identifier of the wireless networks. In this embodiment, the network identifier is used to connect the user to the selected wireless network.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
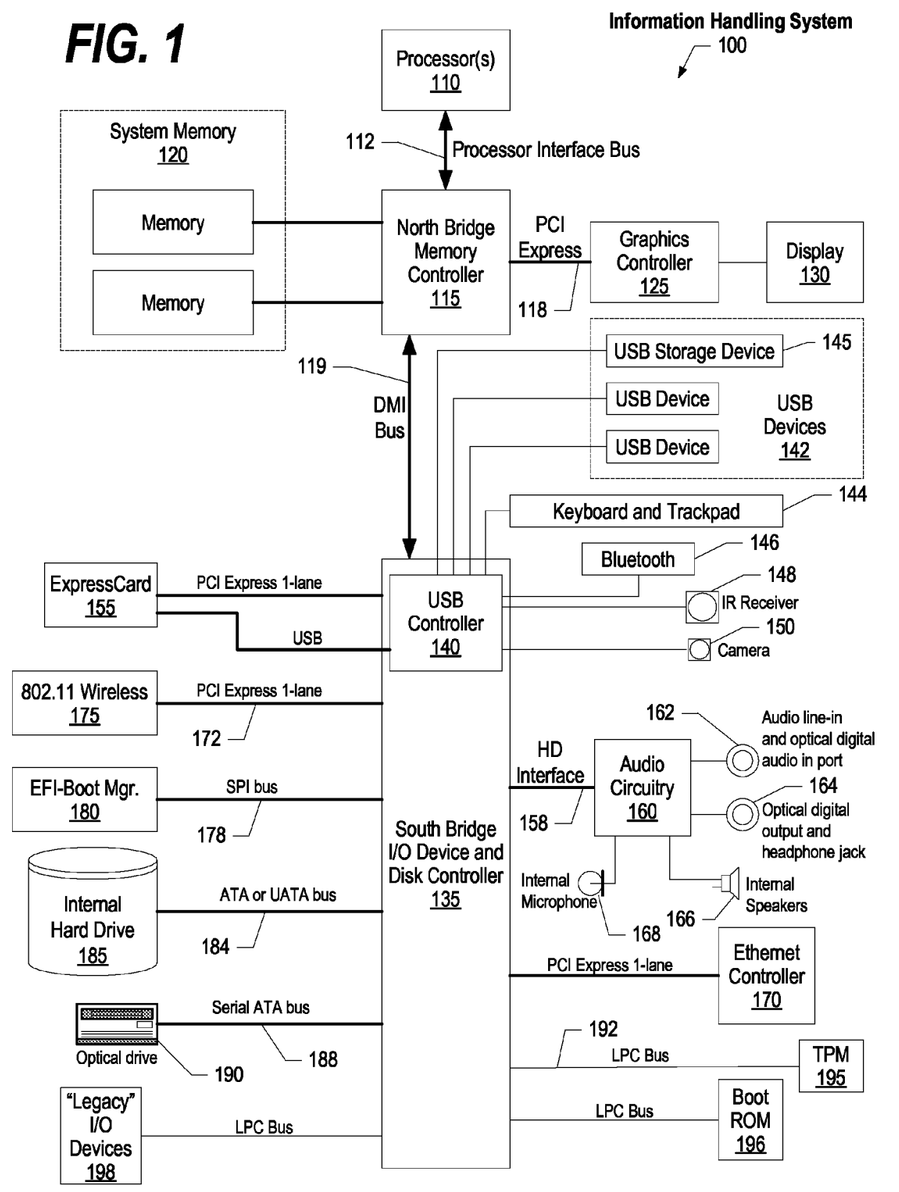
FIG. 1 is a block diagram of a data processing system in which the methods described herein can be implemented.
Figure 2:
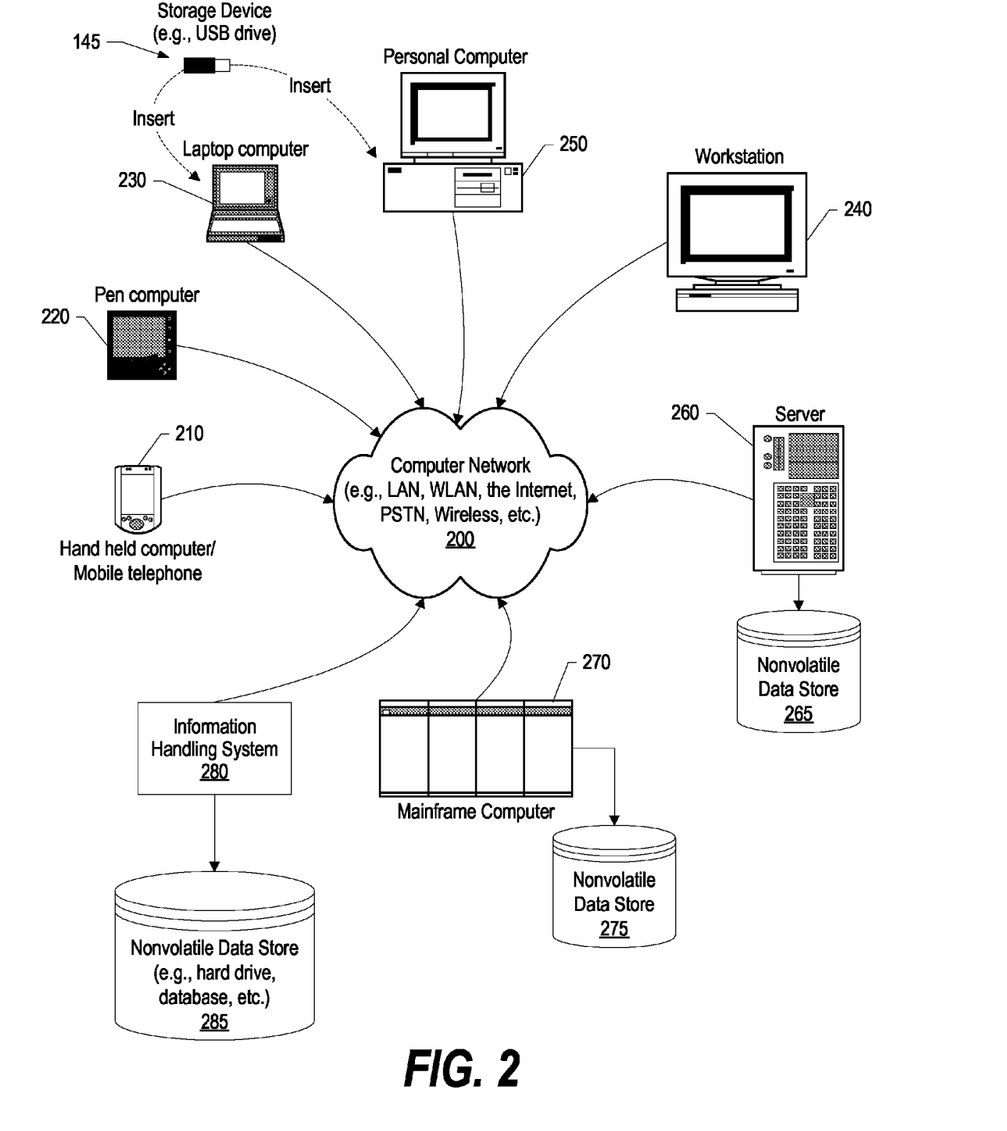
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
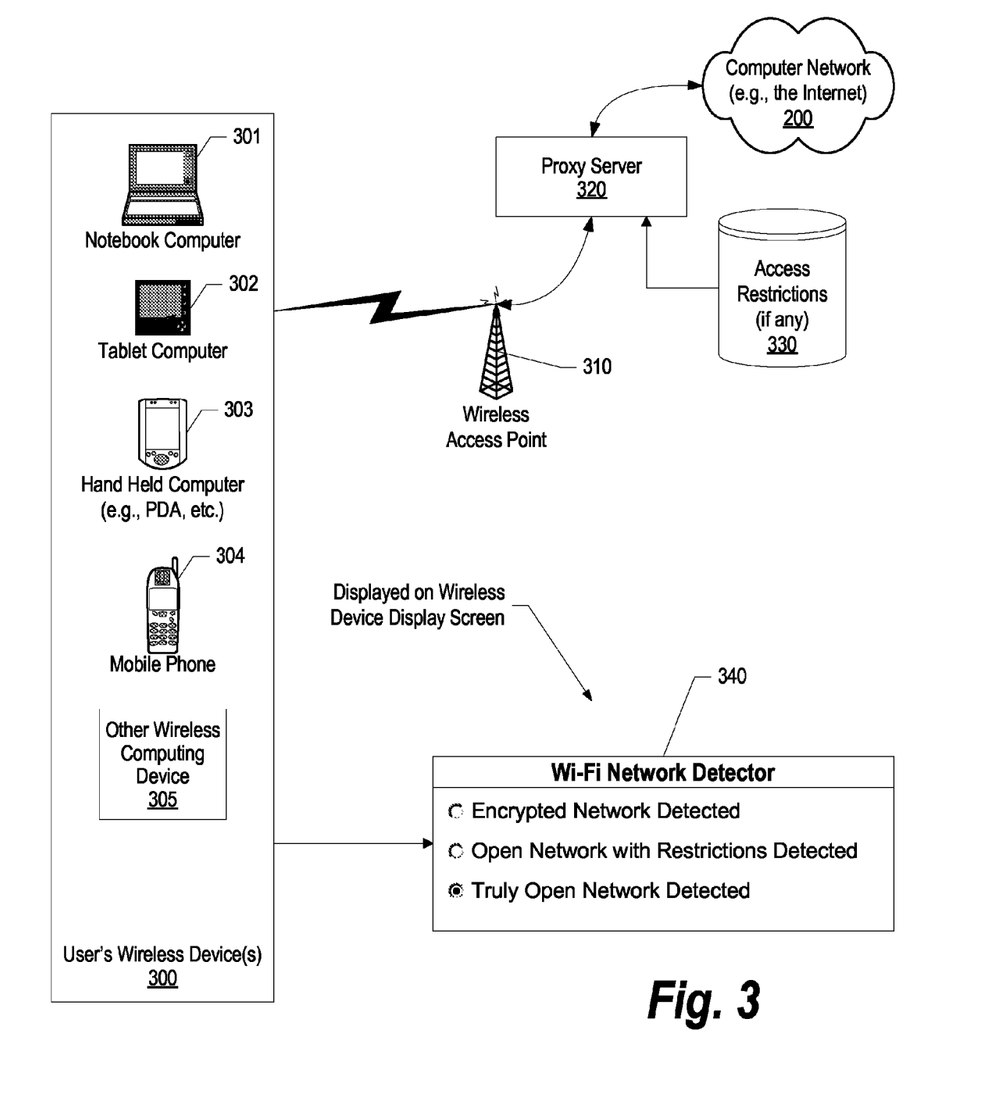
FIG. 3 is a diagram showing components used in detecting a truly open wireless network and a sample network detector display.

FIG. 3 is a diagram showing components used in detecting a truly open wireless network and a sample network detector display. As a user travels around with wireless device 300, unrestricted (truly open) wireless networks are detected. As shown, wireless devices include such devices as notebook computer system 301, tablet computer system 302, handheld computer system 303, also referred to as a personal digital assistant (PDA), mobile telephone 304, and any other wireless device 305 capable of executing the instructions described herein.

When the user is in proximity of a wireless network, denoted as wireless access point 310, the wireless network is detected by wireless device 300 and various aspects of the detected wireless network are ascertained. The wireless network is used to gain access to computer network 200, such as the Internet. Often, proxy server 320 facilitates access between wireless network 310 and computer network 200. The wireless network may be a protected (encrypted) network that requires the use of secrets, such as keys or passwords, In order to use the wireless network. In addition, unencrypted networks may impose additional access restrictions 330, such as agreement by the user to various terms and conditions or payment by the user using a credit card or other payment option. The wireless detector technology described herein and installed on user's wireless device 300 identifies wireless networks as well as restriction levels that correspond to the various identified wireless networks. Wireless detector display 340 displays the type of wireless network detected with a preference of detecting truly open wireless networks, with truly open wireless networks being unencrypted networks that do not impose restrictions in order to use the wireless network to access computer network 200. As shown, display 340 differentiates between wireless networks that are protected (encrypted), networks that are unencrypted but impose one or more restrictions, and networks that are unencrypted networks that do not impose restrictions on use of the network. In one embodiment, those networks that are unencrypted and do not impose restrictions are preferred networks. In other words, the user is notified of the presence of wireless networks that are unencrypted and that do not impose restrictions on usage before being notified of other wireless networks (encrypted and those that impose restrictions) that are in the user's vicinity.

Figure 4:
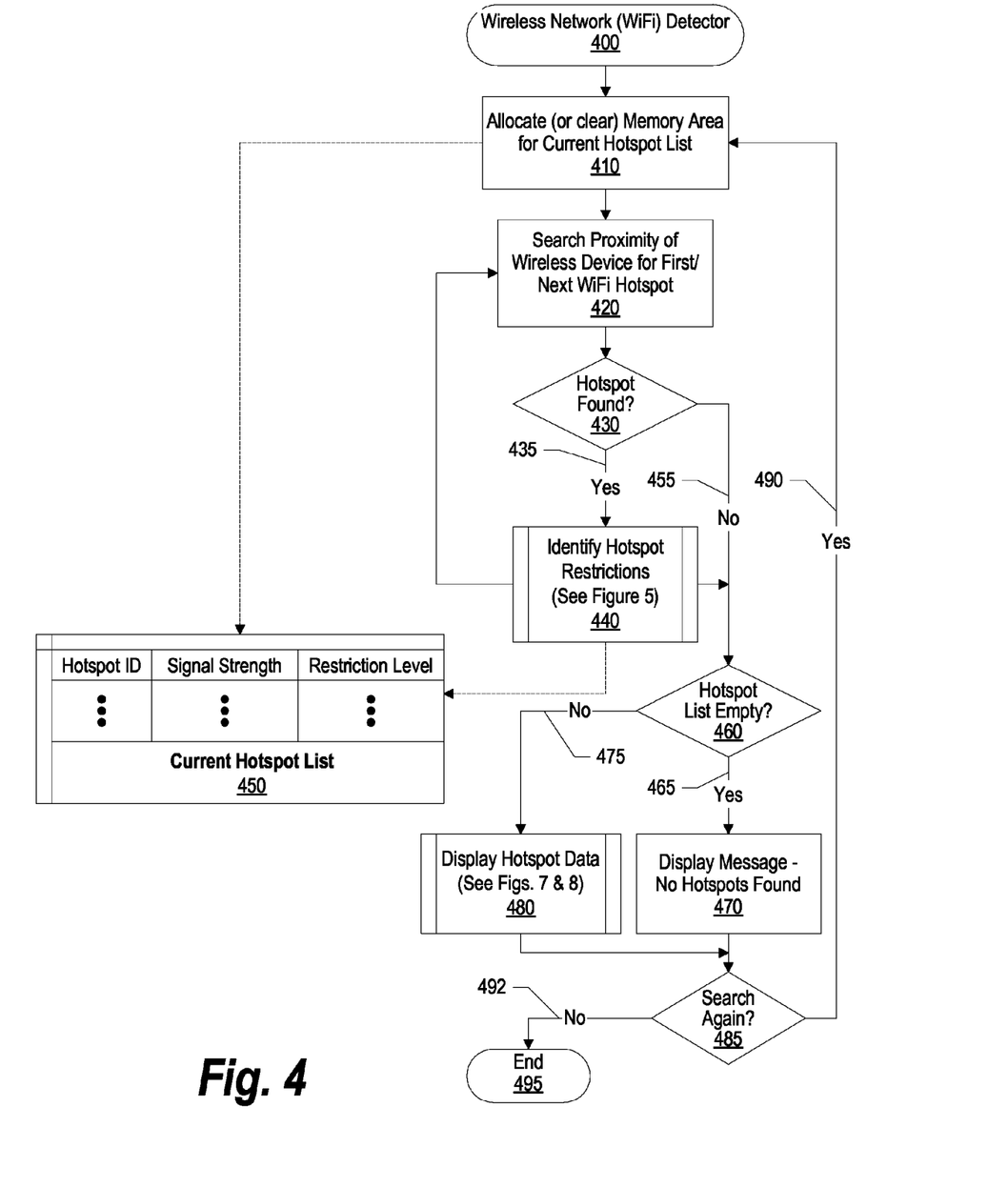
FIG. 4 is a flowchart showing high steps performed by a wireless network detector to detect various types of wireless networks.

FIG. 4 is a flowchart showing high steps performed by a wireless network detector to detect various types of wireless networks. Wireless network detector processing commences at 400 whereupon, at step 410, a memory area that will be used to store the current hotspot list is allocated. If the memory area has already been created, then the memory is cleared at step 410. The current hotspot list is a listing of data corresponding to wireless networks that are range of (proximate to) the wireless network detector.

At step 420, the wireless network detector searches for wireless networks (hotspots) within proximity of the detector. A determination is made as to whether a first wireless network is detected (decision 430). If a first wireless network is detected, then decision 430 branches to "yes" branch 435 whereupon, at predefined process 440, wireless network (hotspot) restrictions that apply to the detected wireless network are identified (see FIG. 5 and corresponding text for processing details). As shown, data records corresponding to each of the detected wireless networks are stored in current wireless network (hotspot) list 450. Data fields included in these records includes the wireless network identifier corresponding to the wireless network, the wireless signal strength of the wireless network, and the restriction level that applies to the wireless network. In one embodiment, restriction levels identify if the wireless network is "closed" (encrypted) or "open" (unencrypted). In addition, for unencrypted wireless networks, the restriction level also indicates whether additional restrictions are imposed by the wireless network in order to use the network or if the no additional restrictions are imposed by the wireless network. Additional restrictions may include having to pay a fee in order to use the wireless network. After data corresponding to the detected wireless network has been identified and stored in current wireless network list 450, processing loops back to step 420 to search for additional wireless networks that are in proximity to the wireless network detector. This looping continues until no more wireless networks are detected, at which point decision 430 branches to "no" branch 455.

A determination is made as to whether the current wireless network list is empty, indicating that no wireless networks were found in proximity to the wireless detector (decision 460). If the list is empty, then decision 460 branches to "yes" branch 465 whereupon, at step 470, a message is displayed to the user indicating that there currently are no wireless networks in proximity to the wireless detector. On the other hand, if the current wireless network list is not empty, then decision 460 branches to "no" branch 475 whereupon, at predefined process 480, the user is notified of one or more current wireless networks in the vicinity (see FIGS. 7 and 8 and corresponding text for processing details). After either the list has been displayed or a message indicating that there are no available wireless networks has been displayed, a determination is made as to whether to search the vicinity once again (decision 485). The searching shown in FIG. 4 might be set to repeat at some time interval (e.g., every 5 minutes). In this manner, if the user is currently traveling, the list of wireless networks in proximity to the user's wireless device would likely change as the user enters new wireless network regions and exits other wireless network regions. If the processing is to repeat, then decision 485 branches to "yes" branch 490 which loops back to clear the list of current wireless networks in proximity to the wireless detector and repeat the detection and identification steps outlined in FIG. 4. This looping continues until no further searching is desired, at which point decision 485 branches to "no" branch 492 and processing ends at 495.

Figure 5:
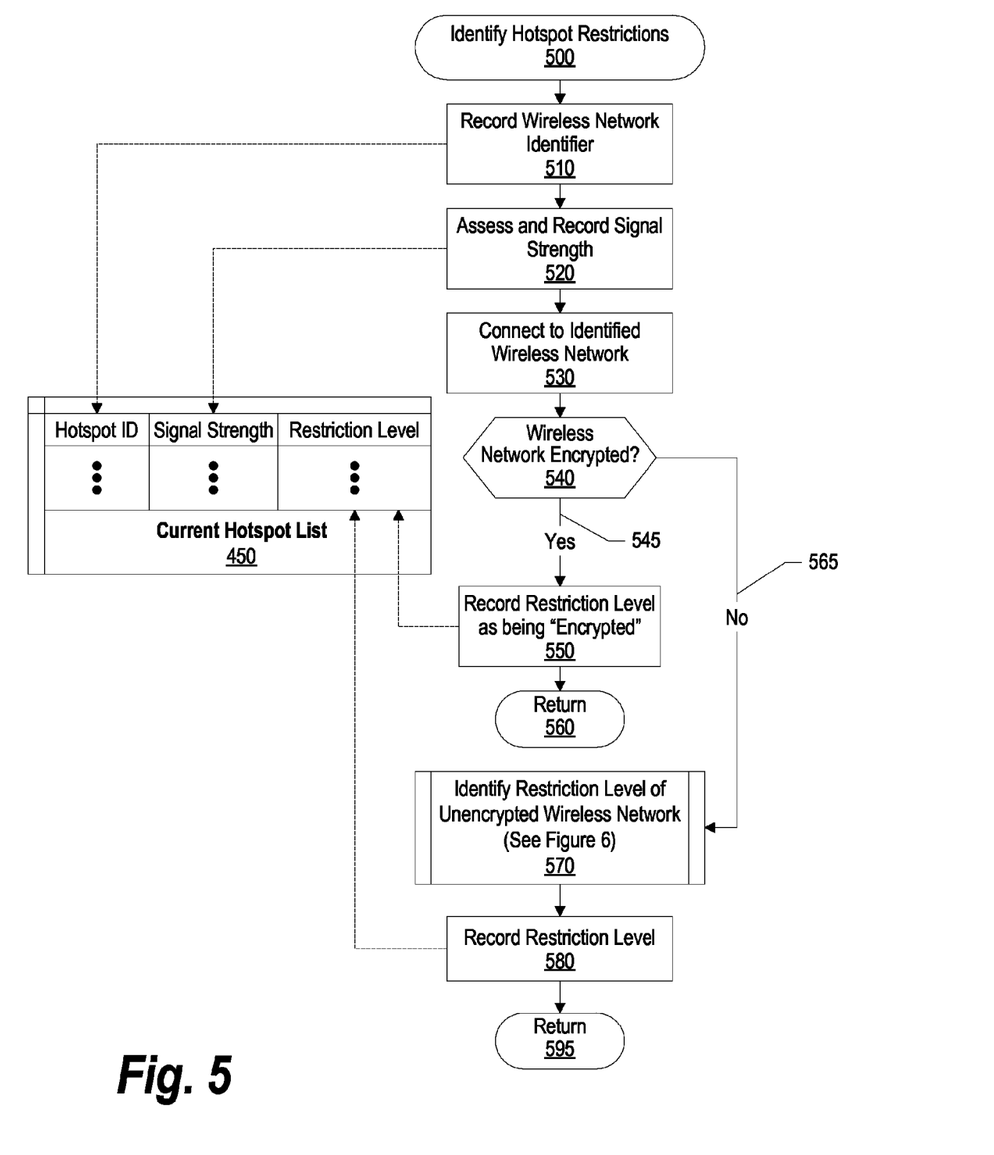
FIG. 5 is a flowchart showing steps performed to identify restrictions that apply to detected wireless networks.

FIG. 5 is a flowchart showing steps performed to identify restrictions that apply to detected wireless networks. This processing is called by predefined process 440 shown in FIG. 4. Returning to FIG. 5, processing commences at 500 whereupon, at step 510, a new record is added to wireless network list 450 and the wireless network identifier corresponding to the wireless network that was detected is recorded in the new record. At step 520, the signal strength of the wireless network is accessed and recorded in record that was added to current wireless network list 450. The signal strength often reflects the distance from the wireless network with a stronger signal strength generally providing greater bandwidth and throughput than a wireless network with lesser signal strength. If two open and unrestricted wireless networks are found in proximity to the user, the signal strength would likely be used to by the user to select the wireless network with the stronger signal strength.

At step 530, an attempt is made to connect to the identified wireless network. Without the required key or password, the user's wireless device will be unable to connect to an encrypted wireless network. A determination is made as to whether the wireless network is an encrypted (closed) wireless network (decision 540). If the identified wireless network is encrypted, then decision 540 branches to "yes" branch 545 whereupon, at step 550, the restriction level of the wireless network is recorded as "encrypted" or "closed" and processing returns to the calling routine (see FIG. 4) at 560.

Figure 6:
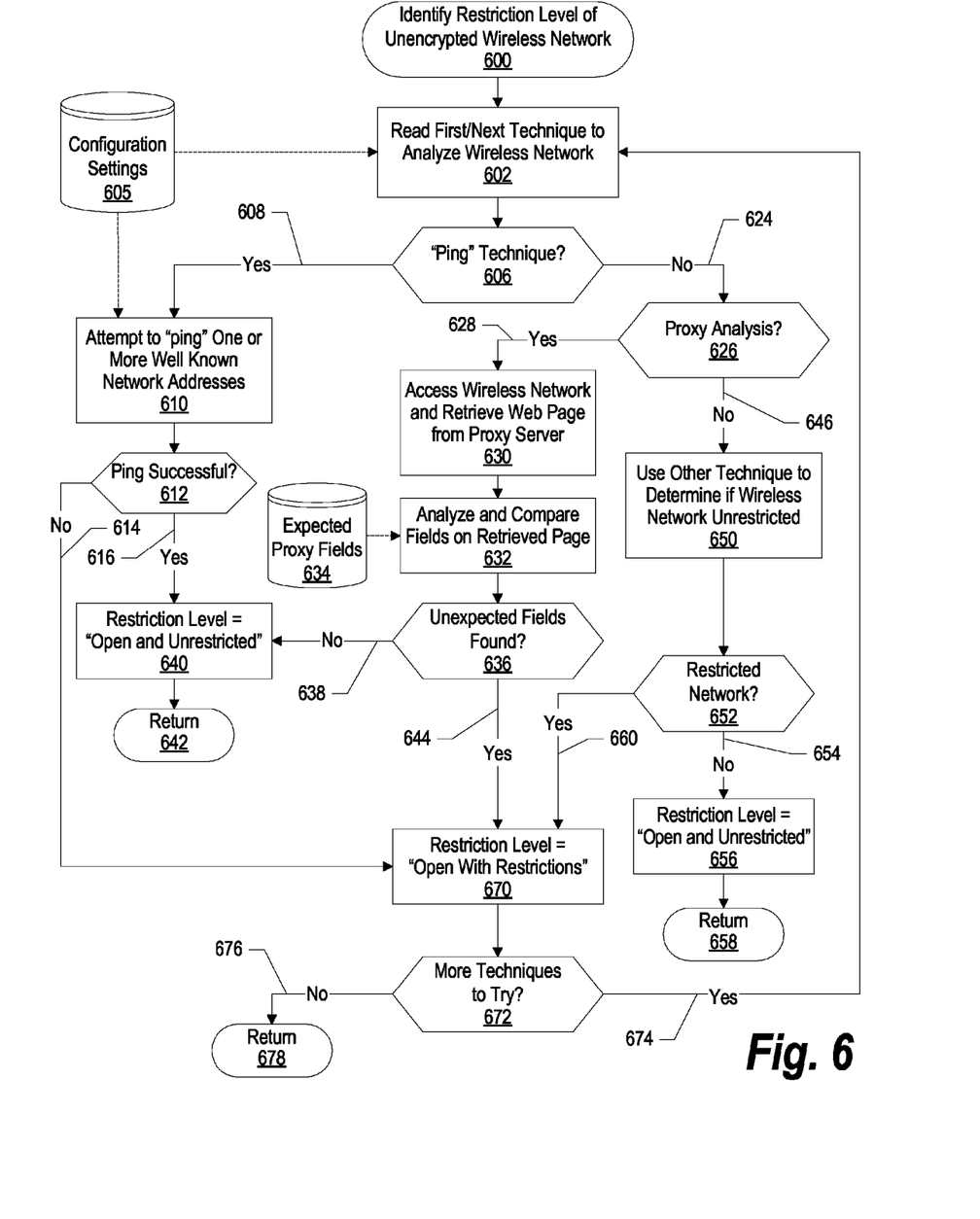
FIG. 6 is a more detailed flowchart showing steps performed to identify the restriction level of an unencrypted wireless network.

On the other hand, if the wireless network is not encrypted, then decision 540 branches to "no" branch 565 whereupon, at predefined process 570, the restriction level of the unencrypted wireless network is identified (see FIG. 6 and corresponding text for processing details). The identified restriction level is then recorded in current wireless network list 450 at step 580. Processing then returns to the calling routine (see FIG. 4) at 595.

FIG. 6 is a more detailed flowchart showing steps performed to identify the restriction level of an unencrypted wireless network. Processing commences at 600 whereupon, at step 602, the first technique to use to analyze the detected wireless network is retrieved from configuration settings 605. A determination is made as to whether the retrieved technique is the "ping" technique (decision 606). A ping technique uses a ping command to attempt to contact a well known network resource, such as a web site. If the technique is the ping technique, then decision 606 branches to "yes" branch 608 whereupon, at step 610, a ping request is sent to one or more well known network addresses (e.g., known addresses of Web sites accessible from the Internet). If the resource (e.g., Web site) at the network address receives the ping request it will send back a proper reply. However, if the detected wireless network is imposing certain restrictions, its proxy server will not allow the ping request to be transmitted to the computer network and a timeout will occur when a proper reply is not received during a predetermined time period. A determination is made as to whether the ping was successful (decision 612). If the ping request was not successful, then decision 612 branches to "no" branch 614 whereupon, at step 670, the wireless network's restriction level will classified as being "open with restrictions" (open because the wireless network is not encrypted but "with restrictions" because the ping request was not successful). On the other hand, if the ping request was successful, then decision 612 branches to "yes" branch 616 whereupon, at step 640 the wireless network is classified as "open and unrestricted" ("open" because the wireless network is unencrypted and "unrestricted" because the ping request was successful, signifying that the wireless network does not impose additional restrictions on using the computer network). Processing then returns to the calling process (see FIG. 5) at 642.

Returning to decision 606, if the ping technique is not being used, then decision 606 branches to "no" branch 624 whereupon a determination is made as to whether the technique is a proxy server analysis (decision 626). If the technique is a proxy server analysis, then decision 626 branches to "yes" branch 628 whereupon, at step 630 the user's wireless device accesses the wireless network and retrieves an initial page of data. At step 632, the proxy analysis technique compares expected fields retrieved from data store 634 to fields found on the retrieved Web page. Based on the comparison of the fields found on the initial page with the expected fields, a determination is made as to whether there are unexpected fields found on the initial page that was provided by the wireless network (decision 636). If there are no unexpected fields found on the initial page, then decision 636 branches to "no" branch 638 whereupon, at step 640, the wireless network is classified as "open and unrestricted" and processing returns to the calling process (see FIG. 5) at 642. On the other hand, if unexpected fields are found on the initial page (e.g., fields requiring the user's acceptance of various terms and conditions or payment of a fee to use the wireless network), then decision 636 branches to "yes" branch 644 whereupon, at step 670, the wireless network is classified as "open with restrictions."

Returning to decision 626, if a proxy analysis technique is not being used to identify whether the open wireless network imposes restrictions, then decision 626 branches to "no" branch 646 whereupon, at step 650, some other technique is used to determine if the wireless network imposes restrictions on using the wireless network. A determination is made as to whether the other technique reveals that the wireless network is a restricted wireless network (decision 652). If the wireless network imposes restrictions, then decision 652 branches to "yes" branch 660 whereupon, at step 670, the wireless network is classified as "open with restrictions." On the other hand, if the other technique reveals that the wireless network does not impose usage restrictions, then decision 652 branches to "no" branch 654 whereupon, at step 656, the wireless network is classified as "open and unrestricted" and processing returns to the calling routine (see FIG. 5), at 658.

If the first technique tried classified the wireless network as "open with restrictions" it may be that the technique failed to operate but the wireless network is actually unrestricted if a different technique is tried. A determination is made as to whether one or more additional techniques should be tried to see if the wireless network is restricted or unrestricted (decision 672). If one or more additional techniques should be tried, then decision 672 branches to "yes" branch 674 which loops back to read the next technique from data store 605 and process the wireless network using the new technique accordingly. When all (one or more) techniques have been tried and the wireless network is still classified as "open with restrictions," then decision 672 branches to "no" branch 676 and processing returns to the calling routine at 678 (see FIG. 5) classifying the wireless network as "open with restrictions."

Figure 7:
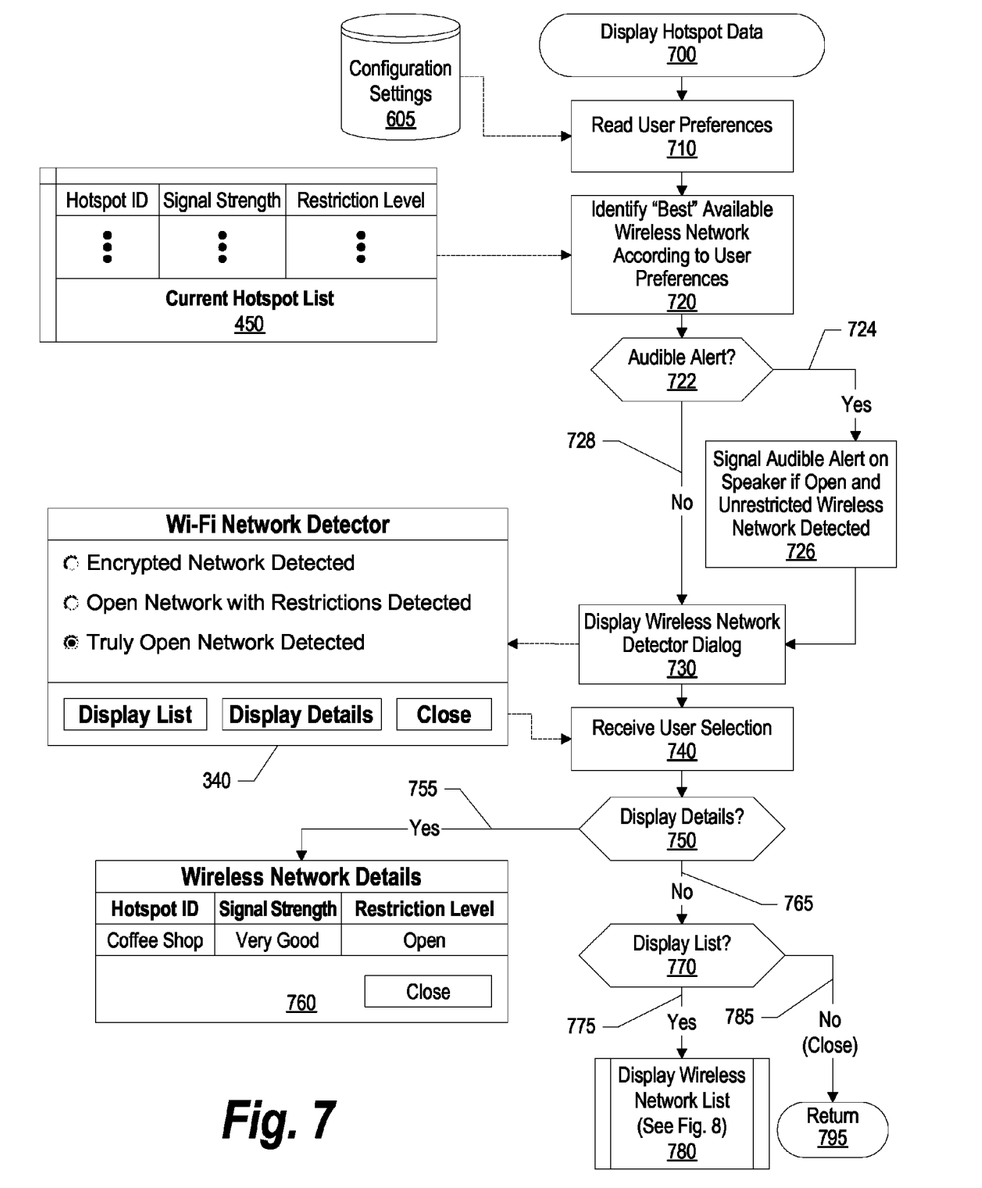
FIG. 7 is a flowchart showing steps taken to display detected wireless network data for a wireless network that best matches a user's wireless network preferences.

FIG. 7 is a flowchart showing steps taken to display detected wireless network data for a wireless network that best matches a user's wireless network preferences. Processing shown in FIG. 7 is called at predefined process 480 shown in FIG. 4. This processing shows a routine that could be utilized by a wireless device with a constrained display screen size, such as a display typically found in mobile telephones, personal digital assistants (PDAs), and the like. In addition, the routine shown in FIG. 4 could also be utilized by wireless devices with larger displays with the detector dialog (340) only taking up a small portion of the larger display screen.

Processing commences at 700 whereupon, at step 710, user preferences are retrieved from data store 605. These preferences are directed at the delivery of the wireless network information (audible signal, etc.) as well as the selection of the "best" wireless network for the user. In one embodiment, the "best" wireless network is selected as being the wireless network that is open and unrestricted (truly open) with the strongest signal. At step 720, the current wireless network data is analyzed in order to determine the "best" wireless network that is currently in proximity to the user's wireless device.

A determination is made as to whether an audible alert should be triggered (decision 722). If an audible alert should be triggered, then decision 722 branches to "yes" branch 724 whereupon, at step 726, the audible alert is sounded. In one embodiment, an audible alert is sounded when the user's wireless device is in proximity to an open and unrestricted wireless network. For example, if the user's mobile telephone is performing the processing shown in FIG. 7 and the user is traveling and interested in using an open and unrestricted wireless network, then the user's mobile telephone would sound an audible alert when an open and unrestricted wireless network is detected in proximity to the user's wireless device, in this case the user's mobile telephone. At this point, the user can use the mobile telephone or a different wireless device (e.g., a laptop, a PDA, etc.) and use the open and unrestricted wireless network that has been detected. If an audible alert is not being used, then decision 722 branches to "no" branch 728 bypassing step 726.

At step 730, wireless network dialog 340 is displayed that indicates the "best" wireless network that has been detected. As previously mentioned, in one embodiment, the best wireless network is the open and unrestricted wireless network (if one exists) with the strongest signal. At step 740, an input is received from the user's selection of a control shown on display 340. The display includes a command button to display a list of available wireless networks, a command button to display details associated with the "best" wireless network detected, and a command button to close dialog 340. A determination is made as to whether the user has selected to view details associated with the "best" wireless network detected (decision 750). If the user has requested to display details, then decision 750 branches to "yes" branch 755 whereupon wireless network details dialog 760 is displayed. In one embodiment, the wireless network details dialog shows the wireless network (hotspot) identifier, the signal strength, and the restriction level of the wireless network. On the other hand, if the user has not requested to display details, then decision 750 branches to "no" branch 765 whereupon a determination is made as to whether the user has requested to view a list of all wireless networks that are in proximity to the user's wireless device (decision 770). If the user has requested to view a display of all wireless networks in proximity to the user's wireless device, then decision 770 branches to "yes" branch 775 whereupon, at predefined process 780 the list of wireless networks currently in proximity to the user's wireless device is displayed (see FIG. 8 and corresponding text for processing details). On the other hand, if the user did not request to view a list of wireless networks currently in the user's proximity, then decision 770 branches to "no" branch 785 as the user has requested to close dialog 340 and processing ends at 795.

Figure 8:
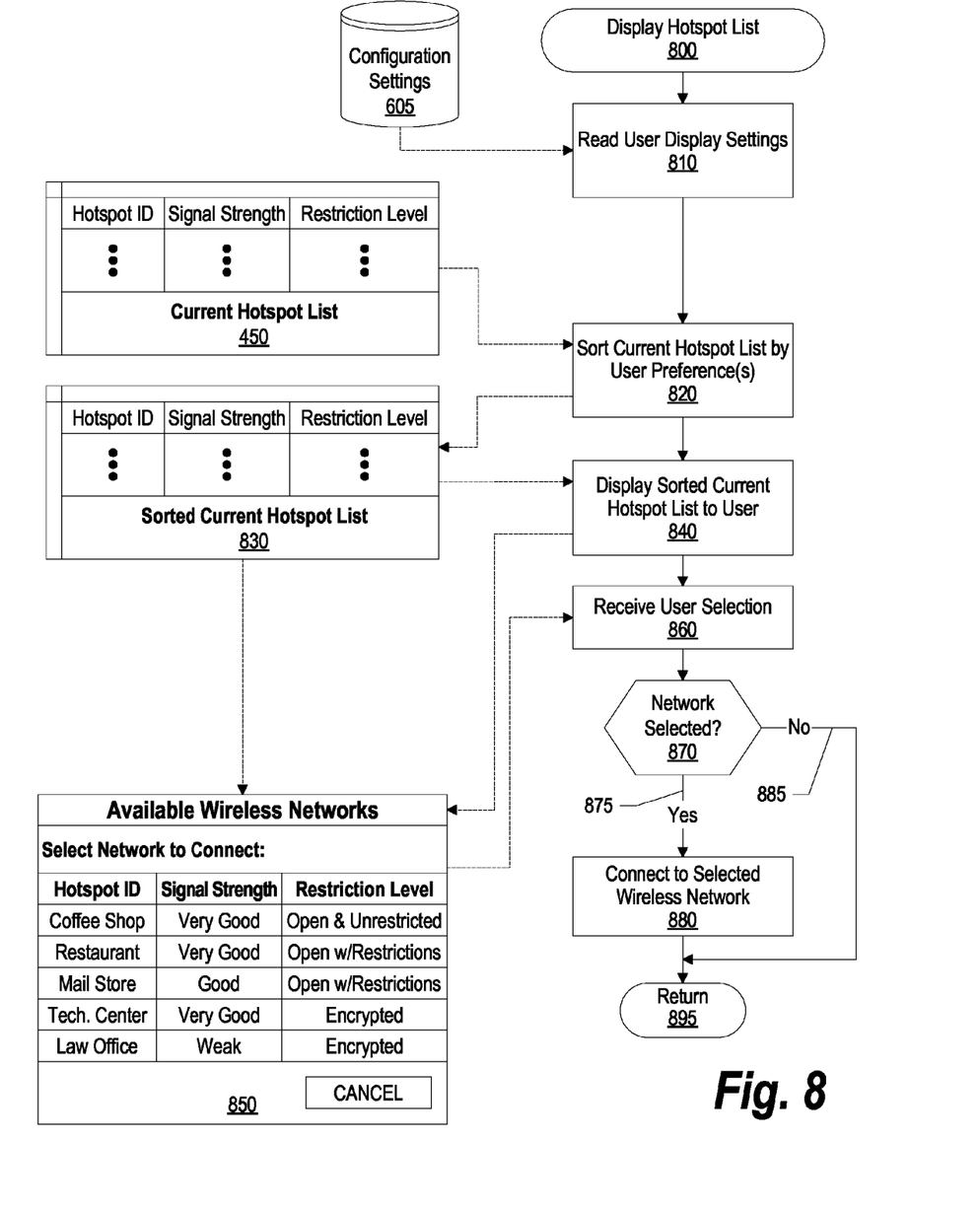
FIG. 8 is a flowchart showing steps taken to list all available wireless networks detected sorted by the user's wireless network preferences.

FIG. 8 is a flowchart showing steps taken to list all available wireless networks detected sorted by the user's wireless network preferences. The processing shown in FIG. 8 is called from predefined process 480 (see FIG. 4) as well as predefined process 780 (see FIG. 7). Processing to display the list of wireless networks currently in proximity to the user commences at 800 whereupon, at step 810, the user's display setting preferences are read from configuration data store 605.

At step 820, current wireless network list 450 is sorted based on user preferences. In one embodiment, current wireless network list 450 is sorted first by restriction level and then by signal strength within each restriction level so that "open (unencrypted) and unrestricted" wireless networks are listed first with stronger signal levels appearing before weaker signal levels. After "open and unrestricted" wireless networks, any "open (unencrypted) and restricted" networks are displayed, also in decreasing order of signal strength. Finally, any "closed" (encrypted) wireless networks are displayed in order of their signal strengths. Step 820 results in sorted wireless network list 830.

At step 840, the sorted wireless network list is displayed to the user in display 850. At step 860, a user selection is received from a selection made using display 850. The user can either select one of the available wireless networks or cancel (close) the display dialog. A determination is made as to whether the user selected one of the available wireless networks (decision 870). If a wireless network was selected, then decision 870 branches to "yes" branch 875 whereupon, at step 880, the user's wireless device is connected to the selected wireless network in order to access the computer network. On the other hand, if a wireless network was not selected by the user, then decision 870 branches to "no" branch 885 bypassing step 880. Processing then returns to the calling routine at 895.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented on an information handling system, said method comprising:
    passively detecting an existence of one or more wireless networks in proximity to a wireless signal detector;
    determining whether each of the detected wireless networks is an encrypted wireless network or an unencrypted wireless network;
    in response to determining that one or more of the detected wireless networks are unencrypted wireless networks:
        identifying a restriction level that applies to each of the unencrypted wireless networks, wherein the identifying comprises:
            accessing each of the unencrypted wireless networks and retrieving an initial page of data from each of the accessed unencrypted wireless networks, wherein each of the retrieved initial pages includes one or more fields;
            retrieving one or more expected fields from a data storage;
            comparing the one or more fields included in each of the retrieved initial pages with the one or more expected fields;
            classifying a first set of the unencrypted wireless networks as unrestricted in response to the comparison revealing no unexpected fields included on the pages retrieved from the first set of unencrypted wireless networks; and
            classifying a second set of the unencrypted wireless networks as restricted in response to the comparison revealing one or more unexpected fields included on the pages retrieved from the second set of unencrypted wireless networks; and
        notifying a user of the existence of at least one unprotected and unrestricted wireless network that is in proximity to the wireless signal detector based on the identifying.

2. The method of claim 1 wherein the notifying further comprises:
    sounding an audible alert when at least one unrestricted wireless network is detected in proximity to the wireless signal detector.

3. The method of claim 1 wherein the notifying further comprises:
    reading one or more user preferences;
    comparing the user preferences to data that corresponds to the one or more wireless networks detected in proximity to the wireless signal detector;
    based on the comparison, selecting a best wireless network, the selected best wireless network being one of the unrestricted wireless networks; and
    displaying an indicator on a constrained display that the unrestricted wireless network was detected.

4. The method of claim 1 wherein the notifying further comprises:
    reading one or more user preferences;
    sorting one or more records by one or more data fields included in the records, wherein each record corresponds to the one or more wireless networks detected in proximity to the wireless signal detector based on the user preferences, wherein one of the sorted data fields is a restriction level field that identifies each detected wireless network's restriction level, and wherein the restriction level is selected from the group consisting of a protected network, a restricted network, and an unrestricted network;
    displaying the sorted records on a display screen;
    receiving a selection from a user corresponding to one of the displayed sorted records; and
    connecting the information handling system to a computer network using the wireless network that corresponds to the user's selection.

5. The method of claim 4 wherein the data fields include the restriction level, a wireless network identifier, and a signal strength, the method further comprising:

sorting the records by the restriction level and by the signal strength, wherein the connecting uses the wireless network identifier corresponding to the user's selection.

6. An information handling system comprising:
one or more processors;
a memory accessible by at least one of the processors;
a wireless network adapter accessible by at least one of the processors; and
a set of instructions stored in the memory and executed by at least one of the processors in order to perform actions of:
passively detecting an existence of one or more wireless networks in proximity to a wireless signal detector;
determining whether each of the detected wireless networks is an encrypted wireless network or an unencrypted wireless network;
in response to determining that one or more of the detected wireless networks are unencrypted wireless networks:
identifying a restriction level that applies to each of the unencrypted wireless networks, wherein the identifying comprises:
accessing each of the unencrypted wireless networks and retrieving an initial page of data from each of the accessed unencrypted wireless networks, wherein each of the retrieved initial pages includes one or more fields;
retrieving one or more expected fields from a data storage;
comparing the one or more fields included in each of the retrieved initial pages with the one or more expected fields;
classifying a first set of the unencrypted wireless networks as unrestricted in response to the comparison revealing no unexpected fields included on the pages retrieved from the first set of unencrypted wireless networks; and
classifying a second set of the unencrypted wireless networks as restricted in response to the comparison revealing one or more unexpected fields included on the pages retrieved from the second set of unencrypted wireless networks; and
notifying a user of the existence of at least one unprotected and unrestricted wireless network that is in proximity to the wireless signal detector based on the identifying.

7. The information handling system of claim 6 further comprising:
a speaker accessible from at least one of the processors; and
wherein the action of notifying further comprises sounding an audible alert on the speaker when at least one unrestricted wireless network is detected in proximity to the wireless signal detector.

8. The information handling system of claim 6 wherein the action of notifying further comprises actions of:
reading one or more user preferences from a nonvolatile storage device accessible from at least one of the processors;
comparing the user preferences to data that corresponds to the one or more wireless networks detected in proximity to the wireless signal detector;
based on the comparison, selecting a best wireless network, the selected best wireless network being one of the unrestricted wireless networks; and
displaying an indicator on a constrained display accessible by at least one of the processors, the indicator indicating that the unrestricted wireless network was detected.

9. The information handling system of claim 6 wherein the action of notifying further comprises actions of:
reading one or more user preferences from a nonvolatile storage device accessible from at least one of the processors;
sorting one or more records by one or more data fields included in the records, wherein each record corresponds to the one or more wireless networks detected in proximity to the wireless signal detector based on the user preferences, wherein one of the sorted data fields is a restriction level field that identifies each detected wireless network's restriction level, and wherein the restriction level is selected from the group consisting of a protected network, a restricted network, and an unrestricted network;
displaying the sorted records on a display screen accessible by at least one of the processors;
receiving a selection from a user corresponding to one of the displayed sorted records, the selection received at a user input interface device accessibly by at least one of the processors; and
connecting the information handling system to a computer network using the wireless network that corresponds to the user's selection.

10. The information handling system of claim 9 wherein the data fields include the restriction level, a wireless network identifier, and a signal strength, the information handling system further comprising:
sorting the records by the restriction level and by the signal strength, wherein the connecting uses the wireless network identifier corresponding to the user's selection.

11. A computer program product stored in a computer readable medium, comprising functional descriptive material that, when executed by an information handling system, causes the information handling system to perform actions that include:
passively detecting an existence of one or more wireless networks in proximity to a wireless signal detector;
determining whether each of the detected wireless networks is an encrypted wireless network or an unencrypted wireless network;
in response to determining that one or more of the detected wireless networks are unencrypted wireless networks:
identifying a restriction level that applies to each of the unencrypted wireless networks, wherein the identifying comprises:
accessing each of the unencrypted wireless networks and retrieving an initial page of data from each of the accessed unencrypted wireless networks, wherein each of the retrieved initial pages includes one or more fields;
retrieving one or more expected fields from a data storage;
comparing the one or more fields included in each of the retrieved initial pages with the one or more expected fields;
classifying a first set of the unencrypted wireless networks as unrestricted in response to the comparison revealing no unexpected fields included on the pages retrieved from the first set of unencrypted wireless networks; and
classifying a second set of the unencrypted wireless networks as restricted in response to the comparison revealing one or more unexpected fields included on the pages retrieved from the second set of unencrypted wireless networks; and notifying a user of the existence of at least one unprotected and unrestricted wireless network that is in proximity to the wireless signal detector based on the identifying.

12. The computer program product of claim 11 wherein the action of notifying further comprises functional descriptive material that causes the data processing system to perform additional actions that include:

sounding an audible alert when at least one unrestricted wireless network is detected in proximity to the wireless signal detector.

13. The computer program product of claim 11 wherein the action of notifying further comprises functional descriptive material that causes the data processing system to perform additional actions that include:

reading one or more user preferences;

comparing the user preferences to data that corresponds to the one or more wireless networks detected in proximity to the wireless signal detector;

based on the comparison, selecting a best wireless network, the selected best wireless network being one of the unrestricted wireless networks; and displaying an indicator on a constrained display that the unrestricted wireless network was detected.

14. The computer program product of claim 11 wherein the action of notifying further comprises functional descriptive material that causes the data processing system to perform additional actions that include:

reading one or more user preferences;

sorting one or more records by one or more data fields included in the records, wherein each record corresponds to the one or more wireless networks detected in proximity to the wireless signal detector based on the user preferences, wherein one of the sorted data fields is a restriction level field that identifies each detected wireless network's restriction level, and wherein the restriction level is selected from the group consisting of a protected network, a restricted network, and an unrestricted network;

displaying the sorted records on a display screen;

receiving a selection from a user corresponding to one of the displayed sorted records;

connecting the information handling system to a computer network using the wireless network that corresponds to the user's selection.

15. The method of claim 1 wherein the one or more unexpected fields are selected from the group consisting of a terms and condition acceptance field and a payment field.

16. The information handling system of claim 6 wherein the one or more unexpected fields are selected from the group consisting of a terms and condition acceptance field and a payment field.

17. The computer program product of claim 11 wherein the one or more unexpected fields are selected from the group consisting of a terms and condition acceptance field and a payment field.

* * * * *